United States Patent [19]

Cheng et al.

[11] Patent Number: 5,106,810
[45] Date of Patent: Apr. 21, 1992

US005106810A

[54] METHANOL DISSOCIATION CATALYSTS

[75] Inventors: Wu-Hsun Cheng, Kennett Square, Pa.; August Ferretti, Wilmington, Del.

[73] Assignee: E. I. Du Pont de Nemours and Company, Wilmington, Del.

[21] Appl. No.: 525,829

[22] Filed: May 23, 1990

Related U.S. Application Data

[63] Continuation-in-part of Ser. No. 373,253, Jun. 29, 1989, abandoned.

[51] Int. Cl.⁵ .......................... B01J 21/08; B01J 23/72
[52] U.S. Cl. .................................... 502/241; 502/244; 502/245
[58] Field of Search .................. 502/241, 244, 256, 245

[56] References Cited

U.S. PATENT DOCUMENTS

| | | | |
|---|---|---|---|
| 1,939,708 | 12/1933 | Larson | 23/237 |
| 2,010,427 | 8/1935 | Eversole | 23/233 |
| 3,213,145 | 10/1965 | Field | 260/618 |
| 3,515,514 | 6/1970 | Holmes et al. | 23/212 |
| 3,691,089 | 9/1972 | Janzon et al. | 252/313 |
| 3,826,758 | 7/1974 | Hoffman et al. | 502/241 |
| 4,057,513 | 11/1977 | Biedermann et al. | 502/241 |
| 4,177,167 | 12/1979 | Manara et al. | 252/455 |
| 4,279,781 | 7/1981 | Dienes et al. | 252/463 |
| 4,299,732 | 11/1981 | Ball et al. | 252/455 |
| 4,407,238 | 10/1983 | Yoon | 123/3 |
| 4,826,798 | 5/1989 | Cheng | 502/244 |

FOREIGN PATENT DOCUMENTS

| | | | |
|---|---|---|---|
| 233120 | 6/1959 | Australia | 502/244 |
| 898679 | 5/1984 | Belgium . | |
| 0147569 | 7/1985 | European Pat. Off. . | |
| 2398695 | 2/1979 | France . | |
| 46-49677 | 2/1973 | Japan . | |
| 8205027 | 7/1984 | Netherlands . | |
| 963911 | 7/1964 | United Kingdom | 502/244 |
| 1156449 | 6/1969 | United Kingdom . | |

OTHER PUBLICATIONS

Ai, Applied Catalysts, 11, pp. 259-270 (1984).
F. Morelli, et al., "Some Remarks on the Activation Energy Variation in the Methanol Decomposition on Zinc Oxide", pp. 471-474 (1972).
Frolich, et al., Ind. and Eng. Chem., 20(7), p. 694 (1928).
Seelig, et al., Ind. and Eng. Chem., 40(4), p. 583 (1948).

*Primary Examiner*—Carl F. Dees

[57] ABSTRACT

The activity of nonfused methanol dissociation catalysts containing copper and optionally chromium, magnesium, calcium, barium, strontium, manganese, molybdenum, ruthenium and palladium can be improved by the incorporation of 0.1 to 20 weight percent amorphous silica.

10 Claims, No Drawings

METHANOL DISSOCIATION CATALYSTS

CROSS REFERENCE TO RELATED APPLICATION

This application is a continuation-in-part of U.S. patent application Ser. No. 07/373,253, filed June 29, 1989, (now abandoned).

BACKGROUND OF THE INVENTION

This invention relates to catalysts for the dissociation of methanol to carbon monoxide and hydrogen.

Methanol is a stable, easily stored and handled liquid which can be readily shipped over long distances. It is known that it can be dissociated to synthesis gas by the following reaction:

$$CH_3OH \rightarrow CO + 2H_2.$$

The term synthesis gas is generally used to describe various mixtures of carbon monoxide and hydrogen which are useful in a variety of chemical reactions.

The dissociation is usually conducted by contacting the methanol in the vapor phase with a catalyst at temperatures of 200° to 600° C. and pressures from 1 to 50 atmospheres (100 to 5000 kPa). Many catalysts have been disclosed to be useful in the process, i.e., Group VIII metal catalysts, copper-zinc, copper-chromium, copper-nickel, copper-zinc-chromium, copper-chromium-manganese, etc.

For example, U.S. Pat. No. 4,407,238 issued Oct. 4, 1983, discloses a process for the production of hydrogen and carbon monoxide comprising contacting methanol in the vapor phase with a catalyst comprising manganese, copper and chromium. It is taught that this catalyst can be used on a silica support.

Japanese Patent Application 46-49677 published Feb. 28, 1973, claims a copper, chromium, manganese oxide catalyst useful in the manufacture of high purity hydrogen from the reaction of methanol and steam. In an example, the metal oxide catalyst is mixed with about 40% diatomaceous earth prior to reduction with hydrogen and contact with the methanol steam mixture. Use of this catalyst for methanol dissociation without steam is not taught.

U.S. Pat. No. 1,939,708 issued Dec. 19, 1933, discloses a fused catalyst for the gas phase production of methanol and other oxygenated hydrocarbons. The catalyst is the reduction product of a fused mixture of copper oxide, manganese oxide, and an oxide of one of magnesium, aluminum, or silicon.

The melting temperature of these oxides is known to be well over 1000° C. It is also well known in the art that catalysts prepared from fused mixtures have an undesirably low surface area due to the elevated temperatures required for the fusion. See for example Hashimoto, K., et al., Proc. Pac. Chem. Eng. Congr., 3d, Vol. 2, pp. 244-249, Kim, C., et al., Ed., Korean Inst. Chem. Eng., Seoul, S. Korea (1983) for a discussion of the decrease in the surface area of silica-alumina catalysts under conditions of high temperature and steam. Stanislaus, A., et al., Appl. Catal., Vol. 41, 109-119 (1988) disclose that heating Co-Mo/Al$_2$O$_3$ and Ni-Mo/Al$_2$O$_3$ catalysts above 600° C. results in loss of surface area and activity. U.S. Pat. No. 4,420,422 issued Dec. 13, 1983, discloses that solid state firing at temperatures of 600°-1200° C. in the preparation of bismuth pyrochlore results in a surface area lower than that desired.

It is desirable to provide a catalyst which dissociates methanol with high selectivity and high conversion to carbon monoxide and hydrogen. Nonfused catalysts having a higher surface area than fused catalysts generally have greater activity. High selectivity is especially desirable to minimize the formation of unwanted or wasteful by-products.

SUMMARY OF THE INVENTION

We have found that the addition of a small amount of amorphous silica into many copper-containing catalysts improve their activity in methanol dissociation catalysis.

The methanol dissociation catalyst of this invention comprises a nonfused catalyst of high surface area of 20-99.9 wt % copper and 0.1-20 wt % amorphous silica. The catalyst may also contain 5-75% chromium and 0.1-30% of one or more metals chosen from magnesium, calcium, barium, strontium, manganese, molybdenum, ruthenium and palladium.

DESCRIPTION OF THE INVENTION

The nonfused catalysts of the invention contain copper and amorphous silica and optionally one or more other metals chosen from chromium, magnesium, calcium, barium, strontium, manganese, molybdenum, ruthenium and palladium. These catalysts have a minimum surface area of about 30 m$^2$/g. In the dissociation process at about 250° C., these catalysts provide conversion rates as high as 91%, with selectivities typically in the range of 90-95%. The principal impurities produced during the dissociation reaction using the catalyst of the invention are methyl formate, dimethyl ether, carbon dioxide and methane. Methyl formate is typically the major by-product and can be recycled and further decomposed to carbon monoxide and hydrogen.

It is important that the catalyst contains 20-99.9 wt % copper and 0.1-20 wt % amorphous silica. The catalyst can also contain one or more alkaline earth or transition metals or their oxides or hydroxides chosen from the group of chromium, magnesium, calcium, barium, strontium, manganese, molybdenum, ruthenium and palladium. Preferred metal additives are chromium (5-75 weight %), manganese (1-5 weight %) and barium (1-15 weight %). Although zinc is commonly used in methanol synthesis, zinc can possibly be detrimental to catalyst performance in the present invention and therefore is not preferred. Srivastava, R. D., "Heterogeneous Catalytic Science"; p. 109, CRC Press Inc. (1988) disclose that the compositions Cu-ZnO-Al$_2$O$_3$ and Cu-ZnO-Cr$_2$O$_3$ are the most important industrial catalysts for methanol synthesis. However, the presence of zinc in the catalysts of the present invention can reduce catalytic activity for methanol dissociation.

Preferably the catalyst contains 10 to 45 weight percent chromium and 2 to 10 weight percent of amorphous silica. In particular, catalysts containing copper and chromium and 2 to 5 weight percent of amorphous silica promoted with manganese, barium or their oxides are preferred. Most preferred are catalysts containing 65 to 75 weight percent copper, 20 to 30 weight percent chromium, 1 to 5 weight percent manganese, and 2 to 4 weight percent amorphous silica.

The catalysts of the present invention have a minimum surface area of about 30 m$^2$/g as determined by the BET nitrogen absorption analysis technique measured after calcination but prior to reduction and use in the methanol dissociation reaction. Preferably the surface area of the catalyst is at least about 39 m²/g. Surface areas from about 30 m²/g to about 250 m²/g can be obtained in the catalyst compositions of the present invention.

The term "nonfused" is used herein to mean that the catalyst is prepared by chemical reaction at a temperature of less than 600° C. which requires no fusion of the components. It is not prepared from the reduction of a fused mixture requiring high temperatures of 600° C. or more. Such a nonfused catalyst is usually prepared via a liquid phase reaction in an aqueous alkaline medium.

In a typical preparation of these methanol-dissociation catalysts, an aqueous solution of the appropriate metal salts is added slowly and with vigorous stirring to silica dispersed in an aqueous solution of sodium carbonate. In some instances, the aqueous solution of sodium carbonate can be replaced with a slurry or solution of calcium carbonate, calcium hydroxide, or sodium hydroxide. After precipitation and mixing are complete, the slurry is filtered to remove the excess liquid and then washed with warm water to remove the by-products of the precipitation process. To minimize the formation of hard agglomerates during the drying process, the wet product may be reslurried with solvent, e.g., acetone, and then dried under a partial vacuum. The resulting catalyst precursor is usually calcined at temperatures of from about 200° C. to about 500° C. to convert the various metal salts to their respective metal oxides. Before its use in the methanol dissociation reaction, the calcined catalyst is reduced in a reducing atmosphere such as $N_2/H_2$ or $N_2/CO$. This calcination and/or reduction can take place in situ within the reactor.

Suitable sources of the transition metals include the water-soluble salts of the metals which do not contain elements capable of acting as catalyst poisons, such as halogen or sulfur. Examples of suitable transition metal sources are nitrates, acetates, oxalates and carbonates, and most preferred are the nitrates.

Similarly, suitable sources of the alkaline earth metals include their salts which do not contain halogen or sulfur. Examples of suitable alkaline earth salts are acetates, benzoates, butyrates, carbonates, citrates, formates, lactates, nitrates, nitrites, oxides, propionates, salicylates, silicates and valerates, and most preferred are nitrates.

Those skilled in the art normally consider silica to be an inert material, and it is often used as an inert support for catalytic reactions. The presence of 0.1 to 20 weight percent, preferably 2 to 10 weight percent, of amorphous silica has been found to unexpectedly promote the activity of copper-based catalysts in methanol dissociation reactions. Suitable sources of amorphous silica include, for example, sodium silicate, silica hydrosol, silica gel, silica sol and silicic acid. The preferred source of silica is an aqueous colloidal dispersion of silica particles. Suitable commercially available sources of silica include Ludox TM Colloidal Silica (Du Pont) and Cabosil TM (Cabot Corporation).

The catalysts of the invention can be employed in the conventional methanol dissociation process. In this process, the catalyst is brought into contact with methanol at usual temperatures of from about 100° C. to about 400° C., preferably from about 200° C. to about 300° C. The reaction is conducted at pressures of about 1 atm. to about 100 atm. (100 to 10000 kPa). The contact time is not critical and usually can vary from about 0.5 to about 20 seconds.

As previously mentioned, the catalysts of the invention enhance conversion significantly while maintaining or improving selectivity to CO and $H_2$.

EXAMPLE 1

General Procedure

A 500 mL capacity glass separatory funnel was positioned above a glass mixing jar of a standard 1250 cc Hamilton Beach food blender. Attached to the outlet end of the separatory funnel was a 10 mm OD glass tube of sufficient length to extend down through the jar cover to within ¼ of the blender blades. Using this arrangement, the contents of the separatory funnel were added slowly to a rapidly stirred solution in the jar. The change of pH in the jar could be followed by the use of a pH meter electrode mounted in the jar.

In general, a mixed nitrate solution was added slowly from the separatory funnel into the rapidly stirred carbonate solution in the blender jar. Alternatively, solids could be added to the carbonate solution by slurry addition from the separatory funnel or by direct placement into the blender jar. Direct placement into the carbonate solution in the blender jar was the preferred method.

The solutions were mixed for 15-30 min and the resulting precipitate was separated by filtration and washed with distilled water to remove the water-soluble by-products of the precipitation process. The washed precipitate was then either granulated using standard apparatus or was air dried in preparation for the calcination step. Typically, 2.6 g of catalyst precursor (or 2.0 g of calcined catalyst) was loaded in a ⅜" OD U-shaped reactor and heated in a sand bath.

Calcination was conducted at 200° C.-500° C. in a vacuum or in an atmosphere of air, $CO_2$, $N_2$, $N_2/H_2$, inert gases or methanol, preferably $CO_2$.

EXAMPLES 2-4

Preparation of $CO_2$-Calcined Catalysts 2-4

Catalyst 2 was prepared by charging a separatory funnel with 500 mL of an aqueous solution of $Cu(NO_3)_2 \cdot 0.3H_2O$ (76.25 g), $Cr(NO_3)_3 \cdot 0.9H_2O$ (51.25 g), and $Mn(NO_3)_2$ (3.6 g, 50-52 weight %). The funnel was positioned above the glass mixing jar of a standard 1250 cc Hamilton Beach food blender, which was charged with 400 mL of an aqueous slurry of $SiO_2$ (1.52 g, Cabosil TM) and $Na_2CO_3$ (70 g). Attached to the outlet end of the funnel was a 10 mm OD glass tube of sufficient length to extend down through the jar cover to with ¼" of the blender blades. The solution from the funnel was added over 15-30 min to the rapidly stirring slurry in the blender. The resulting precipitate was separated by filtration and washed with warm water until the washings were neutral (pH 6-7). The resulting powder was transferred to a clean blender, reslurried with acetone, filtered and the washing process repeated. The resulting free-flowing powder was reslurried with acetone and dried on a rotary evaporator at 60° C. to give a granulated powder.

Catalyst particles in the $-12$, $+20$ mesh size range were calcined and then reduced in $N_2/H_2$ (95/5). Catalyst 4 was prepared essentially as described for the precursor for catalyst 2. Catalyst 3 was obtained by repressing and then crushing catalyst 2. Calcination conditions were as follows: temperature—300° C.; atmosphere - $CO_2$; pressure—30 psia (190 kPa); vessel type—reactor; flow—catalyst 2 = 5 sccm, catalyst 3 = 50 sccm, catalyst 4 = 20 sccm. The surface area of the catalyst was determined using the BET nitrogen absorption analysis technique as described in Lowell and Shields, Powder Surface Area and Porosity, Chapter 4 (1984) and Nelson, Dispersing Powders in Liquids, p. 172, Elsevier, N.Y. (1988), each herein incorporated by reference. All surface areas were measured after calcination but prior to reduction and use in the methanol dissociation reaction unless otherwise indicated.

Table I lists the results and all parts are parts by weight.

EXAMPLES 5-37

Several catalysts of the invention were prepared using the procedures of Example 1 and tested as follows.

The methanol dissociation reactions were conducted at 250° C., 2 atm (200 kPa); the flow rate was set at 35 sccm.

The reaction products were analyzed by two gas chromatographs connected in series and equipped with thermoconductivity detectors. $CO_2$, methanol, methyl formate, dimethyl ether, water and other high boiling products were separated and analyzed in the first GC column (80/100 Porapak T, ⅛"×8' packed column), operated in a temperature-programming mode from 100 to 160° C. at 8° C./min. Gaseous products such as CO, $H_2$, and methane were separated and analyzed in the second column (molecular sieves 5A, ⅛"×8' packed column) operated at 70° C. The carrier gas for both chromatographs was 8.5% $H_2$ in He at 39 sccm.

The conversion of methanol is defined as moles of methanol converted per mole of methanol fed to the reactor. CO and hydrogen are the major products; other products include small amounts of $CO_2$, dimethyl ether, methyl formate and trace amounts of water and methane.

The selectivity to CO is defined as moles of CO produced per mole of methanol reacted.

Table I lists the results, and all parts are parts by weight.

TABLE I

CATALYST PRECURSOR COMPOSITION[a] AND METHANOL DISSOCIATION CONVERSION AND SELECTIVITY

| Ex. | Cu | Cr | Si | X | Atm.[b] | Conv.[c] | Sel.[d] | S.A.[e] |
|---|---|---|---|---|---|---|---|---|
| 2 | 70.28 | 23.24 | 2.49 | Mn = 3.9 | $CO_2$ | 84.4 | 88.4 | — |
| 3 | 70.28 | 23.24 | 2.49 | Mn = 3.9 | $CO_2$ | 72.3 | 90.0 | — |
| 4 | 70.28 | 23.24 | 2.49 | Mn = 3.9 | $CO_2$ | 90.6 | 91.5 | 55* |
| 5 | 76.62 | 12.62 | 2.26 | Ba = 8.44 | Vac | 76.9 | 93.5 | 98 |
| 6 | 73.13 | 24.27 | 2.5 | — | Air | 77.3 | 91.6 | 135 |
| 7 | 66.0 | 25.3 | 2.5 | Mn = 2.5 Ru = 3.6 | Air | 79.0 | 92.7 | 79 |
| 8 | 66.7 | 25.6 | 2.5 | Pd = 2.5 | Vac | 74.4 | 93.2 | 113 |
| 9 | 20.0 | 75.0 | 2.5 | Ba = 2.5 | Vac | 81.3 | 91.7 | 232 |
| 10 | 67.42 | 17.85 | 3.07 | Ba = 11.66 | Air | 57.0 | 85.9 | 109 |
| 11 | 67.42 | 17.85 | 3.07 | Ba = 11.66 | Vac | 57.1 | 86.1 | 101 |
| 12 | 67.42 | 17.85 | 3.07 | Ba = 11.66 | $CO_2$ | 80.0 | 93 | 163 |
| 13 | 67.42 | 17.85 | 3.07 | Ba = 11.66 | Vac | 73.8 | 91.0 | 146 |
| 14 | 67.42 | 17.85 | 3.07 | Ba = 11.66 | Vac | 66.0 | 90.5 | 101 |
| 15 | 85 | 10 | 2.5 | Ba = 1.5 | Vac | 77.8 | 93.5 | 94 |
| 16 | 49.79 | 40.97 | 3.16 | Ba = 6.09 | Vac | 60.3 | 85.7 | 127 |
| 17 | 67.45 | 17.87 | 3.02 | Ba = 11.64 | $CO_2$ | 83 | 92 | 114 |
| 18 | 67.45 | 17.87 | 3.02 | Ba = 11.64 | $CO_2$ | 67.5 | 90.8 | 52* |
| 19 | 47.82 | 39.35 | 3.0 | Sr = 9.7 | Vac | 74.8 | 90.4 | 170 |
| 20 | 71.45 | 18.90 | 3.21 | Mg = 6.42 | Air | 70.3 | 91.6 | 121 |
| 21 | 71.71 | 23.82 | 2.5 | Mn = 1.98 | Vac | 72.1 | 91.7 | 89 |
| 22 | 71.68 | 23.81 | 2.53 | Mn = 1.98 | $CO_2$ | 90.3 | 90.3 | 124 |
| 23 | 67.46 | 17.85 | 3.03 | Ba = 11.66 | $CO_2$ | 88.4 | 90.9 | 113 |
| 24 | 69.91 | 23.22 | 4.95 | Mn = 1.93 | $CO_2$ | 75 | 88.6 | 156 |
| 25 | 66.12 | 29.68 | 1.63 | Mn = 2.56 | Air | 51.2 | 77.8 | 45 |
| 26 | 76.25 | 24.29 | 2.59 | — | Air | 82.8 | 91.3 | 93 |
| 27 | 71.71 | 23.80 | 2.50 | Mn = 1.97 | Air | 48 | 80.4 | 86 |
| 28 | 71.1 | 23.63 | 1.28 | Mn = 3.94 | Air | 61.7 | 88.1 | 119 |
| 29 | 66.7 | 22.16 | 7.45 | Mn = 3.69 | $CO_2$ | 66.5 | 85.7 | 111* |
| 30 | 70.28 | 23.34 | 2.49 | Mn = 3.89 | Air | 72.3 | 92.3 | 130 |
| 31 | 70.33 | 23.36 | 2.42 | Mn = 3.89 | Air | 59.8 | 89.9 | 126 |
| 32 | 73.3 | 24.3 | 0.5 | Mn = 2.0 | Air | 74.3 | 93.6 | 76 |
| 33 | 72.04 | 23.93 | 1.09 | Mn = 2.19 | Air | 65.6 | 89.8 | 75 |
| 34 | 97.05 | — | 2.95 | — | Air | 73.9 | 89.7 | 50 |
| 35 | 97.05 | — | 2.95 | — | $CO_2$ | 72.4 | 95 | 39 |
| 36 | 89.6 | — | 10.4 | — | $CO_2$ | 73.4 | 95.4 | 70 |
| 37 | 65.4 | 17.2 | 2.4 | Mo = 4.9 | Air | 68.5 | 87.4 | — |

[a] Composition by weight percent
[b] Atmosphere for calcination
[c] Moles MEOH converted per mole MEOH input
[d] Selectivity to CO as moles of CO produced per mole of MEOH reacted
[e] Surface area, $m^2/g$, by BET nitrogen absorption analysis technique
*The surface area, $m^2/g$, was measured after the methanol dissociation reaction.

We claim:

1. A composition comprising a nonfused methanol dissociation catalyst of 20 to 99.9 weight percent copper and 0.1 to 10 weight percent amorphous silica.

2. The catalyst of claim 1 further comprising 5 to 75 weight percent of chromium.

3. The catalyst of claim 1 or 2 further comprising one or more metals selected from the group consisting of magnesium, calcium, barium, strontium, manganese, molybdenum, ruthenium, palladium, their oxides, or their hydroxides.

4. The catalyst of claim 3 containing 2 to 10 weight percent amorphous silica.

5. The catalyst of claim 4 containing 10 to 45 weight percent chromium.

6. The catalyst of claim 5 containing 1 to 15 weight percent of barium.

7. The catalyst of claim 5 containing 1 to 5 weight percent manganese.

8. The catalyst of claim 7 containing 65 to 75 weight percent copper, 20 to 30 weight percent chromium, and 2 to 4 weight percent amorphous silica.

9. The catalyst of claim 3 wherein the one or more metals are free of halogen or sulfur.

10. The catalyst of claim 1, 2 or 3 having a minimum surface area of 30 m$^2$/g.

* * * * *